Inventor:
Kurt Liedtke
by Michael J. Striker
Atty

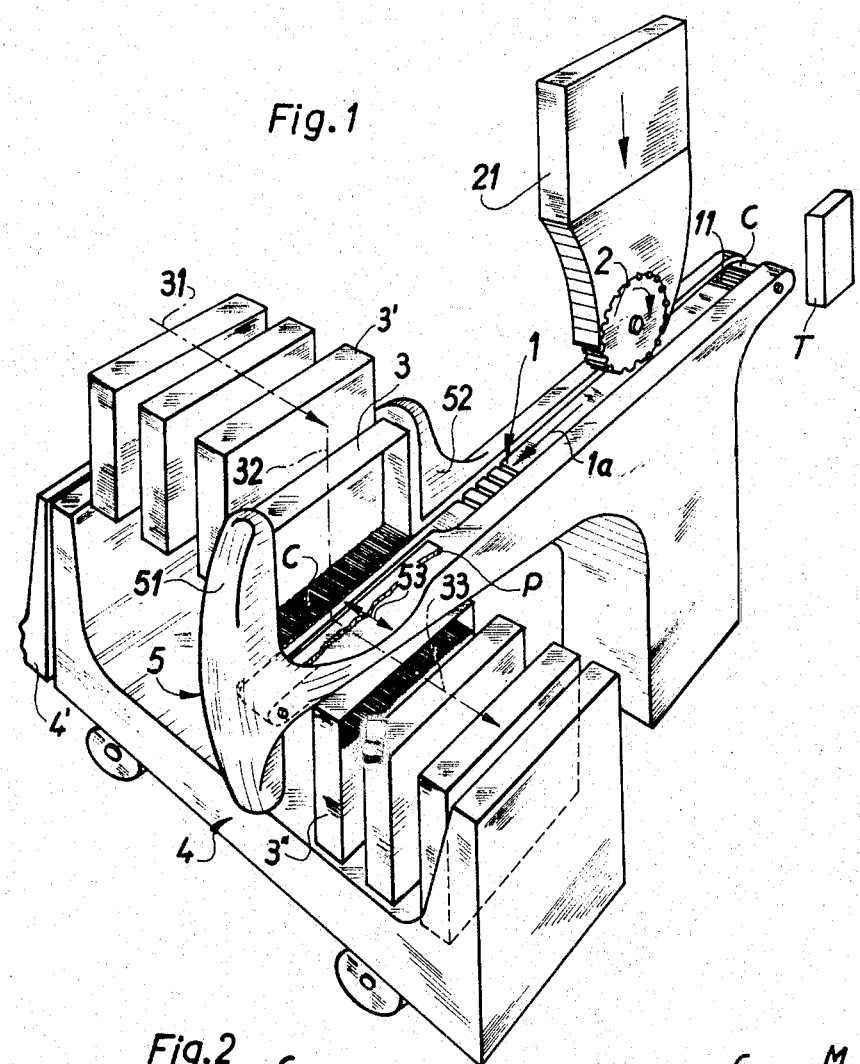
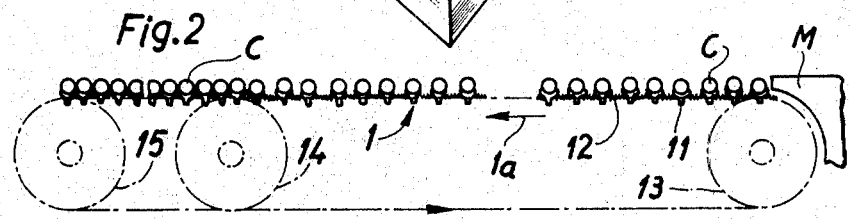

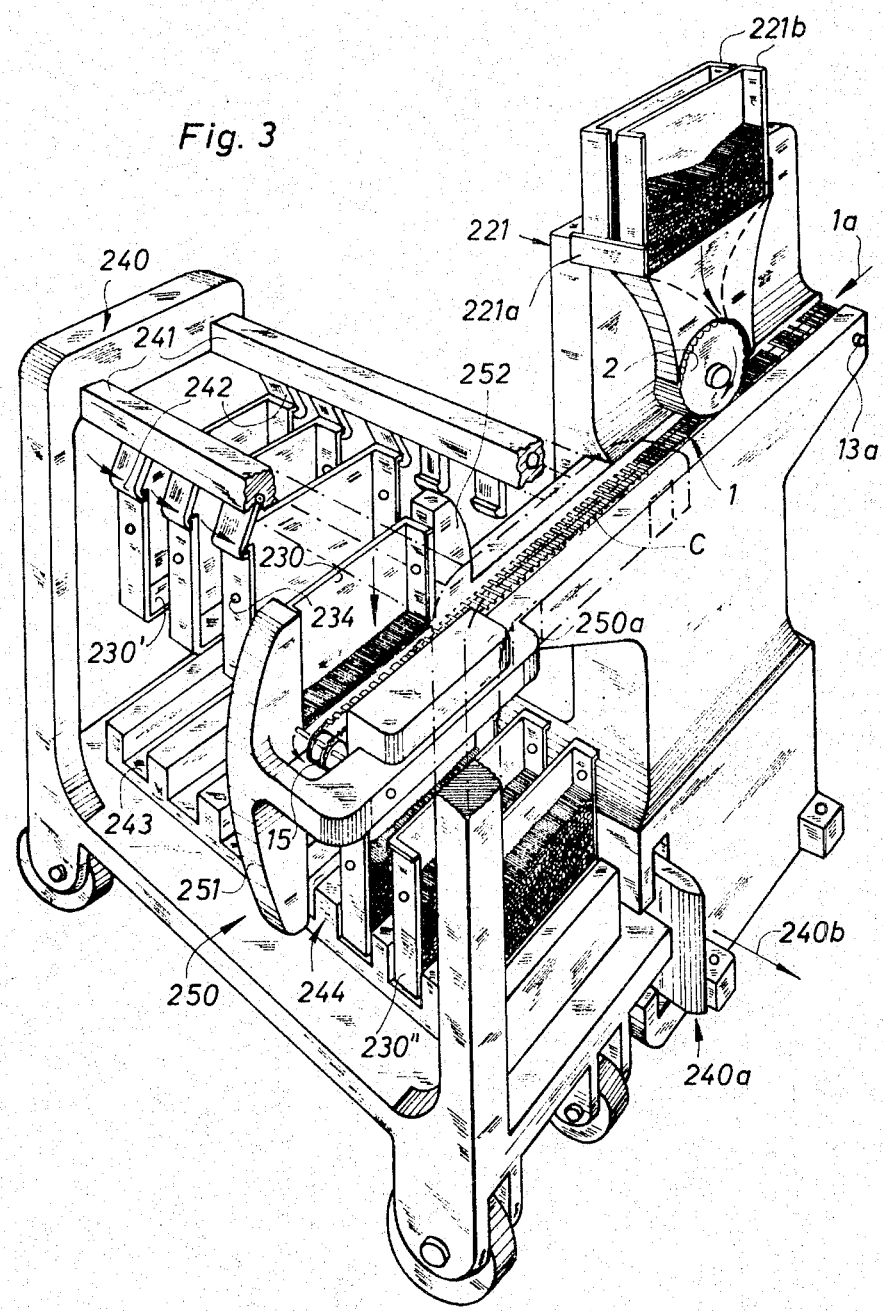

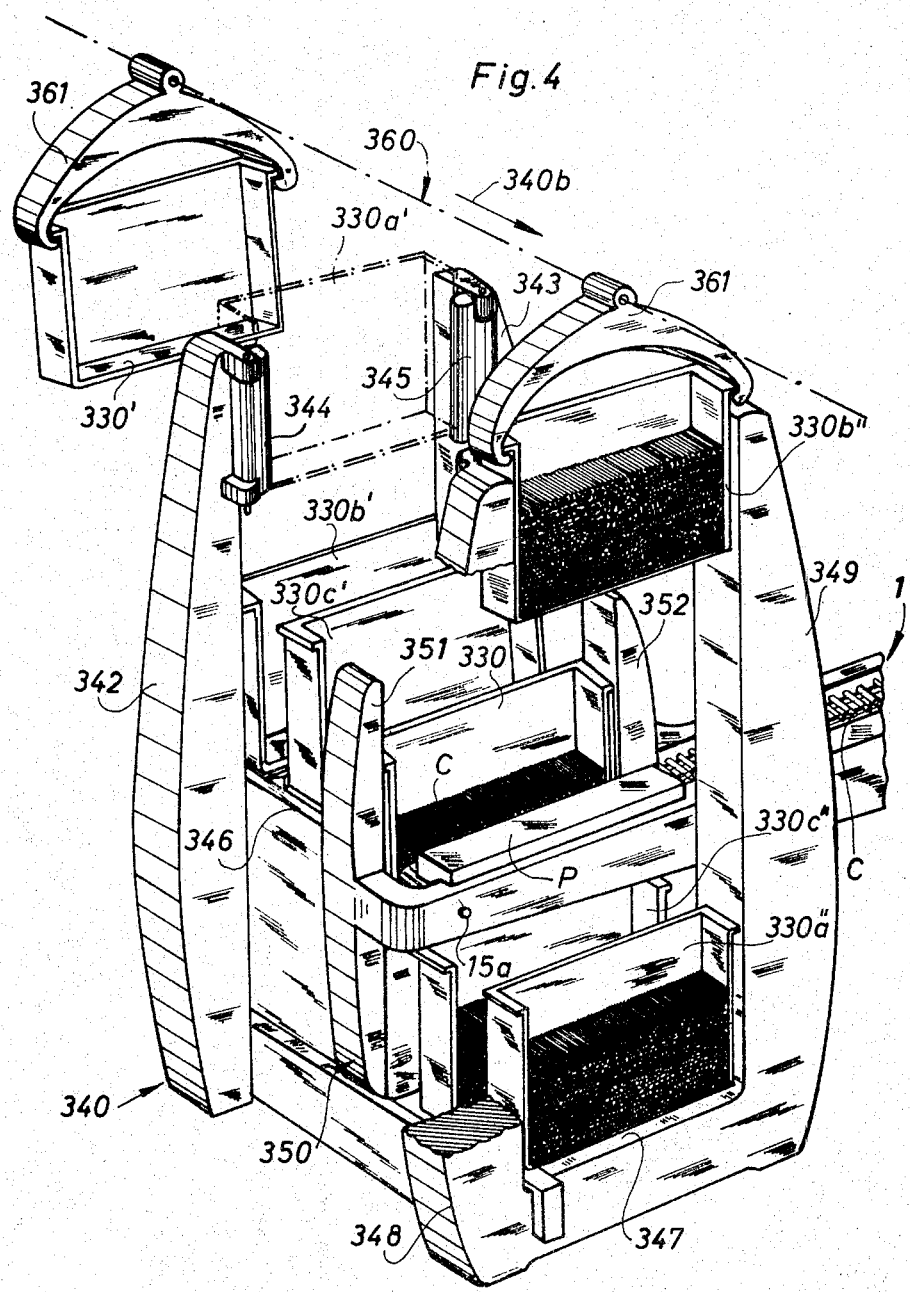

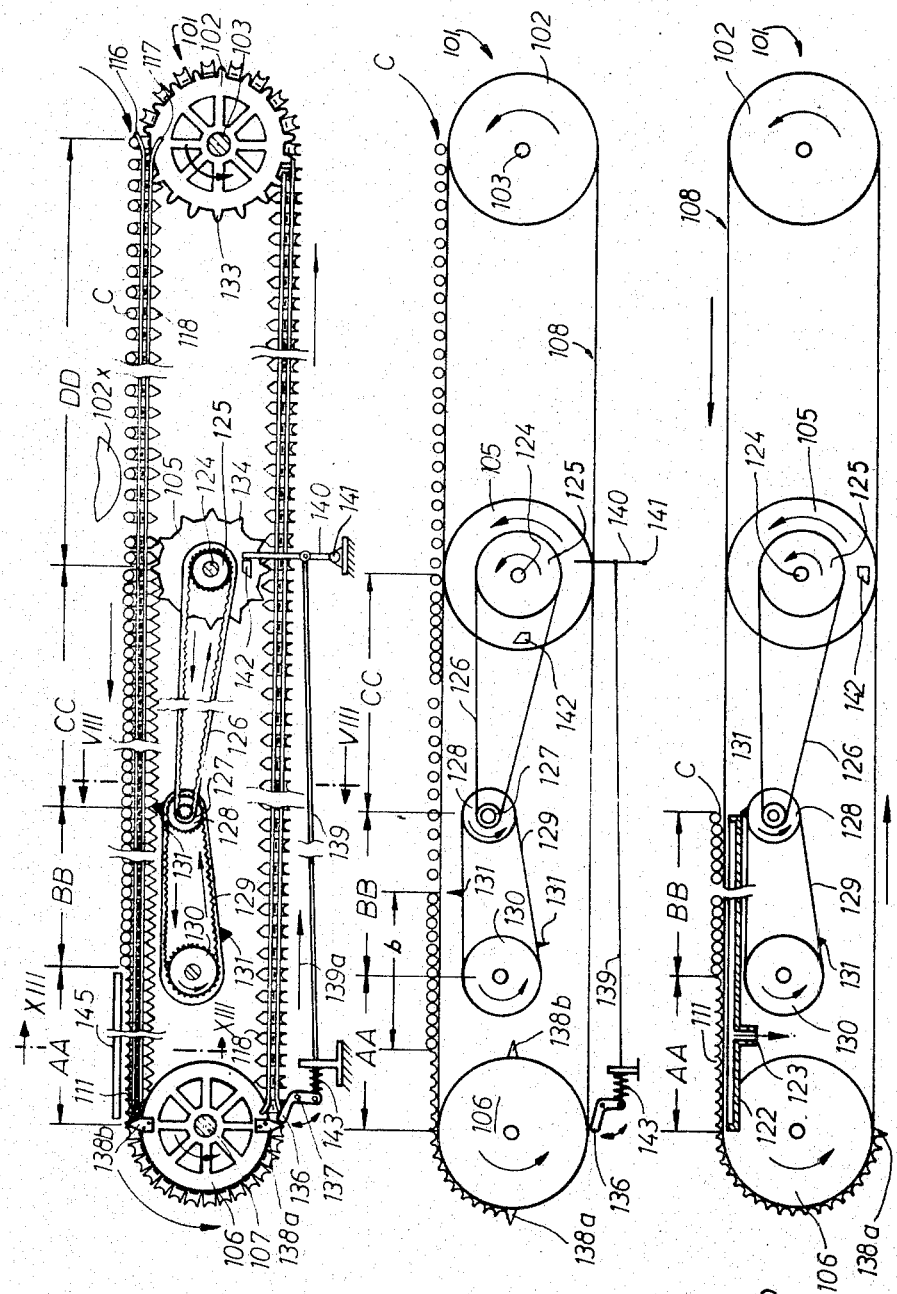

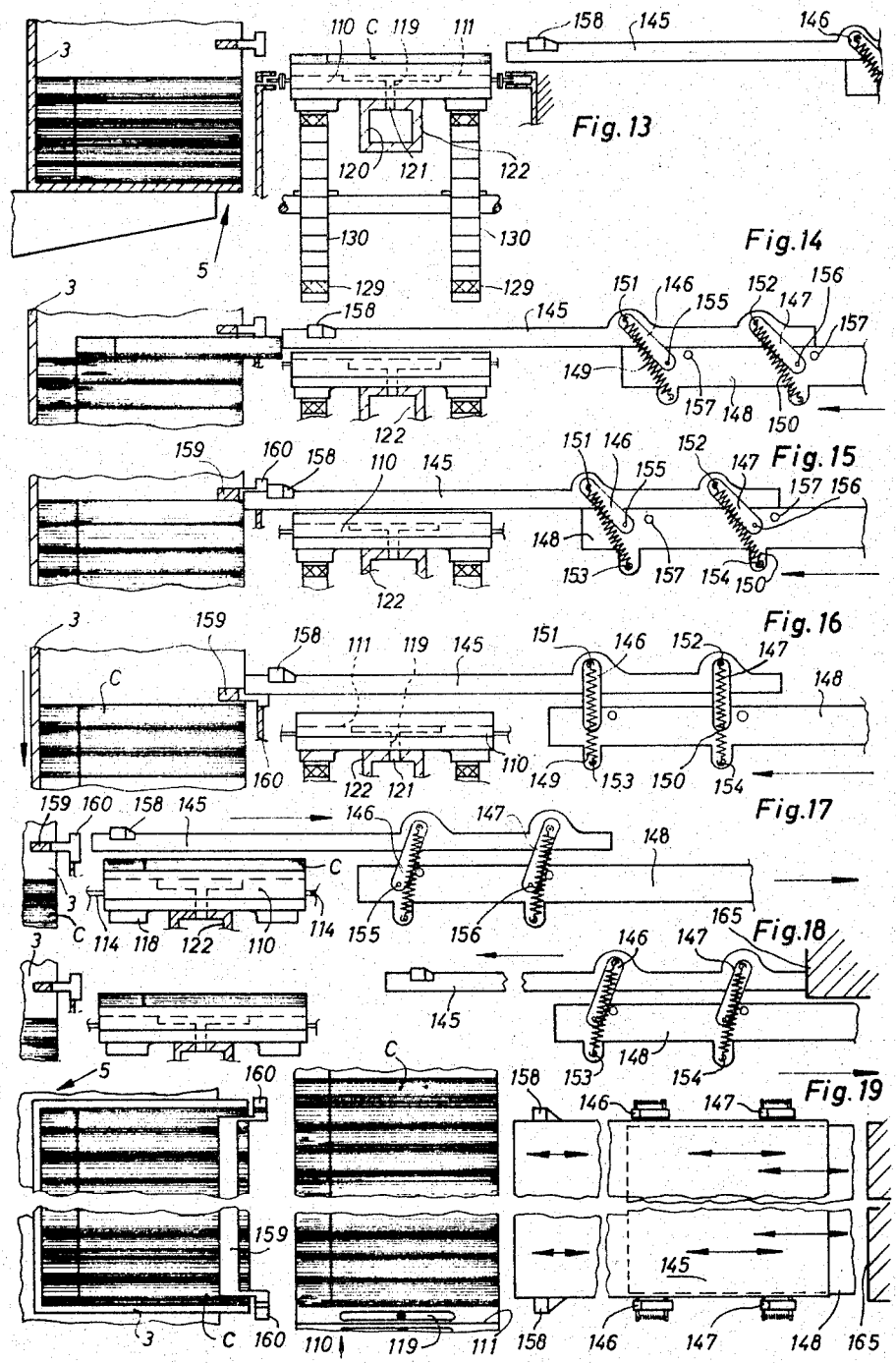

Jan. 30, 1968   K. LIEDTKE   3,365,857
METHOD AND APPARATUS FOR COLLECTING AND MANIPULATING
ROWS OF ROD SHAPED ARTICLES
Filed June 5, 1964   8 Sheets-Sheet 8

Inventor:
Kurt Liedtke
by Michael J. Striker

United States Patent Office 3,365,857
Patented Jan. 30, 1968

3,365,857
METHOD AND APPARATUS FOR COLLECTING AND MANIPULATING ROWS OF ROD SHAPED ARTICLES
Kurt Liedtke, Schwarzenbek, Germany, assignor to Hauni Werke Körber & Co. K.G., Hamburg-Bergedorf, Germany
Continuation-in-part of application Ser. No. 287,348, June 12, 1963. This application June 5, 1964, Ser. No. 373,025
Claims priority, application Great Britain, June 13, 1962, 22,681/62
17 Claims. (Cl. 53—148)

The present invention relates to a method and apparatus for collecting and manipulating rows of rod shaped articles, such as cigarettes, filter cigarettes, cigars, cigarillos, filter rods of unit length or multiple unit length, and the like. More particularly, the invention relates to a method and apparatus for collecting rows of such rod shaped articles with the help of mechanical collecting devices and for thereupon stacking such rows in trays or similar containers. This is a continuation-in-part of my application Ser. No. 287,348, now abandoned.

A modern cigarette rod making machine or filter cigarette machine discharges a continuous stream of cigarette rod sections or filter cigarettes, and such rod shaped articles are thereupon collected to form rows of closely adjacent parallel articles which are stacked in special trays. The articles are normally collected by a suction head, for example, by a suction head of the type disclosed in the copending application Ser. No. 181,669 of Horst Kochalski et al., filed on Mar. 22, 1962 and assigned to the same assignee, now Patent No. 3,190,459 issued June 22, 1965. However, it was found that in some instances the suction head might not be fully satisfactory, and, save for collecting rows of rod shaped articles, such suction head does not perform any other function.

Accordingly, it is an important object of the present invention to provide an apparatus for collecting and manipulating rod shaped articles which are delivered by a machine for processing rod shaped products containing tobacco, filter material or the like, and to construct the apparatus in such a way that the device which actually collects rod shaped articles to form rows performs at least one additional important function with resultant savings in space and material.

Another object of the invention is to provide a novel method of collecting rod shaped articles to form rows of properly arrayed articles, and of thereupon stacking such rows in trays or other types of suitable receptacles.

A further object of the invention is to provide an apparatus for collecting rows of rod shaped articles wherein the device which actually collects the articles to form rows of equidistant articles is constructed and assembled in such a way that each row will contain the same number of articles irrespective of the irregularities in the rate at which such rod shaped articles are fed to the apparatus.

An additional object of the instant invention is to provide a novel collecting conveyor which, in addition to delivering cigarette rods, filter rods of unit length or multiple unit length, filter cigarettes of unit length or multiple unit length, cigars, cigarillos or similar rod shaped articles to a transfer station at which the articles are transferred into trays or other types of containers, simultaneously serves as a means for automatically collecting predetermined numbers of articles to form rows of equidistant articles each of which is ready for immediate transfer into a tray.

A concomitant object of the instant invention is to provide a conveyor of the just outlined characteristics which will form rows of equidisant rod shaped articles at such a speed and within such short intervals of time that it may be used to receive rod shaped articles from modern high-speed cigarette rod making machines or filter cigarette machines.

Still another object of the invention is to provide an auxiliary source of rod shaped articles which cooperates with a collecting conveyor of the above outlined characteristics and which is especially useful in cigarette rod making machines and filter cigarette machines which are equipped with testing devices capable of ejecting all defective articles before such articles reach the transfer station where they are collected and transferred into trays or similar receptacles.

Another object of the invention is to provide a collecting conveyor of the above outlined characteristics which is capable of collecting rows of equidisant rod shaped articles from a continuous stream of such articles and which may be operated in two directions so that it either increases or reduces the distance between the rod shaped articles.

With the above objects in view, one feature of the invention resides in the provision of a method of forming rows of equidisant rod shaped articles. The method comprises the steps of advancing a layer of rod shaped articles along a first portion of a predetermined path in which the articles are located at a first distance from each other, mechanically changing the spacing between the articles in a second portion of the path so that the articles are maintained at a second distance and are parallel to each other, intermittently arresting the articles in the second portion of the path, and removing from the second portion of the path a row containing a predetermined number of parallel articles while the articles are arrested.

For example, and when the method of my invention is resorted to for arraying cigarettes or filter cigarettes prior to transfer of cigarettes into trays in which the rows of cigarettes are stacked one above the other, a layer of cigarettes issuing from a cigarette making machine or a filter cigarette machine may advance sideways along the upper stringer of an endless collecting conveyor having carriers which are movable toward and away from each other. Spaced portions of the upper stringer are driven at different speeds so that cigarettes delivered to the carriers along a first portion of the stringer will move constantly whereas the carriers along a second portion of the upper stringer will move intermittently whereby the spacing between the cigarettes decreases and such cigarettes form a row of closely adjacent rod shaped articles, which may be transferred lengthwise to enter a tray which is adjacent to one side of the second portion of the upper stringer. If necessary, all empty carriers along the first portion of the upper stringer may receive satisfactory cigarettes prior to reaching the second portion of the upper stringer. This is advisable when the collecting conveyor and/or the machine which feeds cigarettes cooperates with suitable testing and ejecting devices which respectively detect and remove all defective cigarettes to prevent entry of such defective articles into a tray or a cigarette pack.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIG. 1 is a perspective view of an apparatus for collecting rod shaped articles to form rows of closely adjacent articles and for stacking the rows in specially configurated containers in the form of trays which are removed from the apparatus by means of a wheel-mounted carriage;

FIG. 2 is a fragmentary schematic side elevational view of a conveyor which serves to collect rows of rod shaped articles and which constitutes a component part of the apparatus shown in FIG. 1;

FIG. 3 is a perspective view of a second apparatus wherein the trays are delivered and removed by means of a different wheel-mounted carriage;

FIG. 4 is a perspective view of a portion of a third apparatus wherein the trays are delivered and withdrawn by means of an overhead conveyor;

FIG. 7 is a side elevational view of a fourth collecting conveyor which may be used in the apparatus of FIGS. 1, 3 and 4 and wherein the carriers are not directly connected to each other;

FIG. 7a is a similar side elevational view showing certain component parts of the fourth collecting conveyor in a different position;

FIG. 7b is another side elevational view showing certain parts of the fourth collecting conveyor in a further position;

FIG. 13 is an enlarged transverse vertical section through the transfer station which receives rows of rod shaped articles from the conveyor of FIG. 7 and whose transfer member is shown in retracted position, the section of FIG. 13 being taken in the direction of arrows as seen from the line XIII—XIII of FIG. 7;

FIG. 14 illustrates the transfer member of FIG. 13 in a different position in which this member has almost completed the transfer of a row of closely adjacent rod shaped articles into a storing tray;

FIG. 15 illustrates the transfer member in one of its end positions just after the transfer member has completed the transfer of a row of rod shaped articles into a partially filled tray;

FIG. 16 illustrates the transfer member in a further position in which this member is raised above and away from the uppermost row of articles in the tray;

FIG. 17 shows the transfer member in another position in which this member is held at a level above the collecting conveyor so that a fresh row of rod shaped articles may be moved into registery with the tray;

FIG. 18 illustrates a further stage in the operation of the transfer member when this member is about to return to the position of FIG. 13;

FIG. 19 is a top plan view of the transfer station and illustrates the transfer member in the position of FIG. 13;

Figure 24:
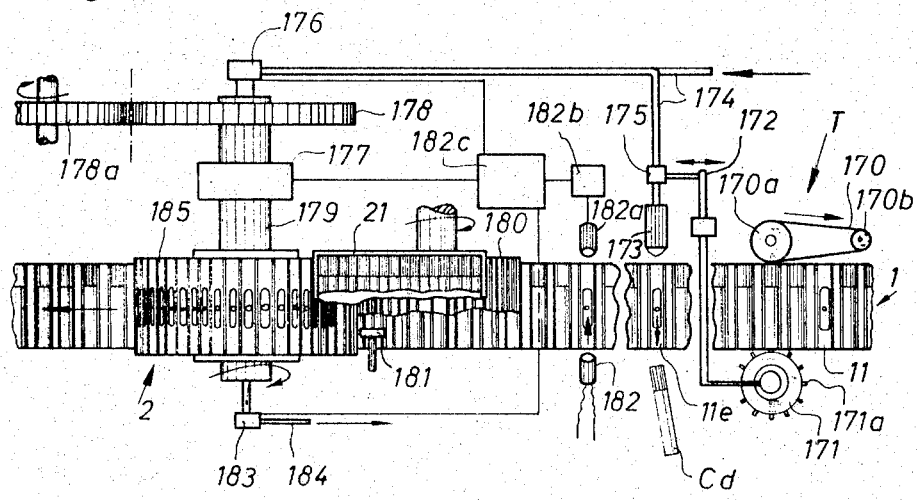
Figure 25:
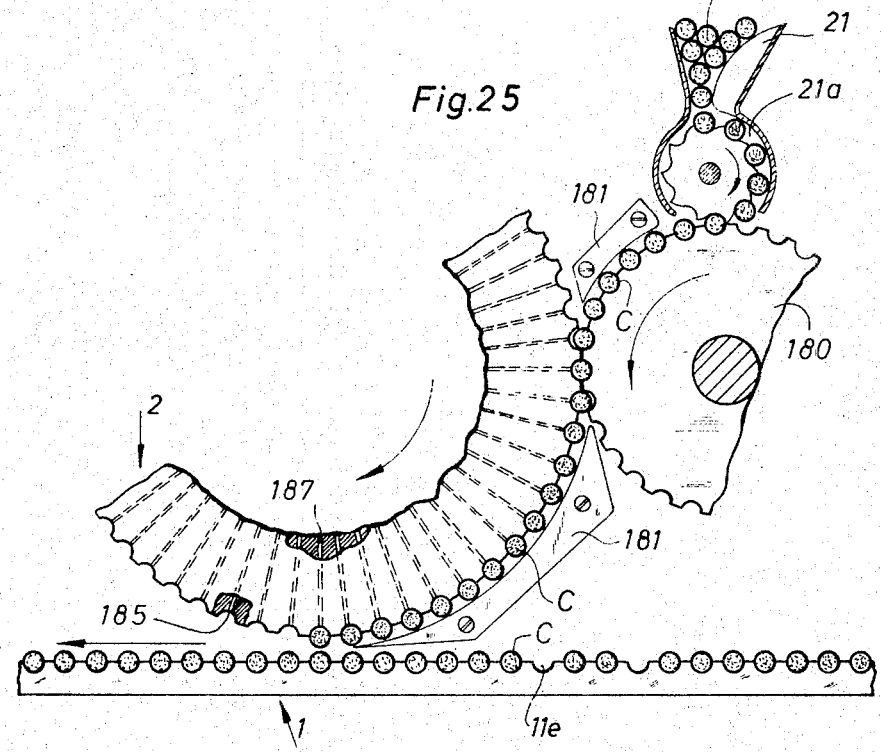

FIG. 24 is a top plan view of a collecting conveyor which cooperates with a specially constructed auxiliary source of rod shaped articles and which receives rod shaped articles in a fully automatic way as soon as a defective article has been ejected from one or more of its carriers while such carriers advance toward the transfer station; and FIG. 25 is a schematic side elevational view of a portion of the structure shown in FIG. 24.

Referring to the drawings, and first to FIG. 1, there is shown a portion of an apparatus which is utilized for collecting elongated rod shaped articles to form rows each of which comprises the same number of equidistant articles, and for thereupon stacking such rows in consecutive containers here shown as trays which descend stepwise subsequent to receiving a fresh row of such articles. The articles C are assumed to be cigarettes or filter cigarettes which are advanced in a horizontal path by a specially constructed endless collecting conveyor 1 having transversely extending carriers or holders 11 each of which may but need not accommodate a cigarette C. It will be noted that the upper stringer of the conveyor 1 advances the cigarettes C in such a way that the axes of the cigarettes are perpendicular to the direction of forward movement (arrow 1a) and that the cigarettes are parallel to each other.

It is customary to test cigarettes which are discharged from a cigarette rod making machine or from a filter cigarette machine with a view to determine whether each wrapper forms an airtight seal, whether the cigarettes are of uniform density and/or whether the weight of consecutive cigarettes is sufficiently close to a predetermined standard value. Defective cigarettes are normally ejected in a fully automatic way so that the single file or layer of cigarettes advancing along the upper stringer of the conveyor 1 includes groups of equidistant cigarettes alternating with cigarettes which are more distant from the nearest cigarettes because a gap will be formed whenever one or more defective cigarettes are ejected subsequent to or during the testing step. A testing device T which is used to determine the density of consecutive cigarettes and/or to detect the presence of leaks in their wrappers is indicated schematically at a point adjacent to the horizontal path of cigarettes which advance toward the upper stringer of the conveyor 1.

The apparatus of my invention will operate properly if the left-hand portion of the collecting conveyor 1, as viewed in FIG. 1, carries a series of equidistant cigarettes before the cigarettes are collected to form rows which are thereupon transferred into an empty or partially filled tray 3 located at the transfer station 5. Therefore, the apparatus comprises an auxiliary source of cigarettes here shown as a magazine 21 which cooperates with a grooved refilling drum 2, and the latter serves to deposit a cigarette on the conveyor 1 whenever the testing device T has detected and initiated the ejection of a defective cigarette, i.e., whenever an empty carrier 11 advances beneath the drum 2.

The manner in which a testing device cooperates with the drum 2 to automatically initate the discharge of one or more cigarettes from the magazine 21 will be described later. Also, and in order to make absolutely sure that each carrier 11 which advances beyond the drum 2 will contain a perfect rod shaped article, the apparatus may comprise a special scanning device which detects the absence of articles at a point ahead of the drum 2 and sends an appropriate impulse to the auxiliary source to fill an empty carrier before the carrier reaches the transfer station. It suffices to say that the portion of the upper stringer advancing beyond the drum 2 comprises a series of carriers 11 each of which accommodates a non-defective cigarette C.

The construction of the conveyor 1 is such that its component parts automatically condense the layer of cigarettes in a zone which is located downstream of the drum 2 (as viewed in the direction of the arrow 1a) so that the layer is transformed into one consisting of closely adjacent cigarettes. A predetermined number of cigarettes entering the transfer station 5 is thereupon transferred into the tray 3 by means of a mechanical transfer member or plunger P which is reciprocable in directions indicated by a double-headed arrow 53. This plunger may be replaced by a pneumatic transfer member which emits a series of jets of compressed air in order to move a row of cigarettes from the conveyor into an empty tray. At the transfer station 5, the apparatus comprises two spaced columns or guides 51, 52 which support the tray 3 and which carry a suitable mechanism capable of lowering the tray in stepwise fashion immediately after the tray receives a new row or layer of closely adjacent cigarettes C. Such stepwise movement of the tray 3 is initiated by an operative connection between the plunger P and the lowering mechanism so that the descent of the tray is fully automatic and need not be controlled by an operator. When the tray 3 has collected a requisite number of rows, i.e., when the tray is at least partially filled, the mechanism at the transfer station 5 deposits the tray onto a wheel-mounted carriage 4 which advances in stepwise fashion in synchronism with the operation of the remaining parts of the apparatus so that the filled tray 3″ is moved in the axial direction of the cigarettes C through a distance which is sufficient to provide room for an empty tray 3′. The direction in which the trays advance through the transfer station 5 is indicated by arrows 31–33, and it will be noted that an empty tray 3′ moves toward the transfer station in a path having a horizontal section (arrow 31) extending in a direction parallel with the axes of the cigarettes C, that the tray thereupon moves in a second section of this path (arrow 32) which is vertical and in which the tray advances intermittently because it receives consecutive rows of closely adjacent cigarettes while descending between the columns 51, 52, and that a filled tray 3″ advances in a third section of the path (arrow 33) which is parallel with but located at a level below the first section (arrow 31). Empty trays 3′ may be delivered by a suitable overhead conveyor or the like, not shown, and the carriage 4 may be hitched to a second carriage 4′ so that one carriage is always in a position to receive a filled tray. It is immaterial whether a leading carriage drags one or more trailing carriages or whether a trailing carriage pushes one or more leading carriages. In the embodiment of FIG. 1, the carriage 4 is driven by a suitable hydraulic or pneumatic mechanism which receives impulses from the transfer mechanism and this carriage 4 pulls the second carriage 4′ until the second carriage reaches a position in which it may receive a first filled tray. The second carriage 4′ then begins to push the carriage 4 and simultaneously pulls a third carriage (not shown) so that the movement of carriages through the apparatus of this invention takes place in a fully automatic way.

FIG. 2 illustrates schematically the manner in which the collecting conveyor 1, and more particularly the upper stringer of this conveyor, condenses that portion of the layer of cigarettes which has advanced beyond the refilling drum 2 so as to form a group of closely adjacent parallel cigarettes and to enable the plunger P to intermittently remove consecutively assembled rows of cigarettes from this group at such intervals that each freshly transferred row may be deposited on the previously transferred row which is already contained in the tray 3. The carriers 11 are connected to each other by elastic elements 12 which may take the form of helical springs or rubber bands and which normally tend to move the adjacent carriers in close proximity to each other so that the carriers will transform a layer of spaced cigarettes into a group of closely adjacent cigarettes ready for transfer into the tray 3. The width of the carriers may approximate or is even less than the diameter of a cigarette to make sure that the rows which are being transferred into a tray contain closely adjacent cigarettes which may be in linear contact with each other.

The conveyor 1 comprises one, two or more link chains which are articulately connected with the carriers 11 and which are trained around three pairs of sprocket wheels 13, 14 and 15. A row of cigarettes which is being transferred into a tray 3 in a single step may contain as many as 56, 60 or more cigarettes. The arrangement is such that the distance between the carriers 11 at the time they travel along the peripheries of the sprockets wheels 13 is the same as the distance between the cigarettes which are delivered from a feeding means, for example, a cigarette making machine, or a filter cigarette machine M shown schematically in the right-hand portion of FIG. 2. The exact construction of this feeding machine M forms no part of the present invention; all that counts is that the machine should feed to the conveyor 1 a continuous stream of cigarettes which may be deposited into each consecutive carrier 11 (if the testing device T will fail to detect any defective articles) or which may be deposited into selected carriers 11 whenever the testing device has detected one or more defective articles which are then ejected prior to or subsequent to their transfer onto the upper stringer of the conveyor 1. The pitch of the sprocket wheels 13 (i.e., the distance between the teeth on these sprocket wheels) corresponds to the distance between the cigarettes which are being delivered by a cigarette rod making machine or a filter cigarette machine and is such that the elastic elements 12 are caused to expand at the time they travel around the wheels 13. The elements 12 remain in expanded condition while they travel toward the intermediate sprocket wheels 14 (arrow 1a). The pitch of the sprocket wheels 14 is different from the pitch of the sprocket wheels 15 so that the carriers 11 are permitted to move closer to each other while they advance from the apices of the wheels 14 toward and around the wheels 15. Consequently, all such carriers 11 which are located between the wheels 14, 15 and which are supported by the upper stringer of the conveyor 1 will be closely adjacent to each other to insure that the layer of cigarettes C is condensed and that the plunger P may remove a row containing a predetermined number of cigarettes in order to advance such row in a direction which is perpendicular to the plane of FIG. 2 and to transfer the row into the interior of that tray 3 which is located between the columns 51, 52 at the transfer station 5 of FIG. 1. The sprocket wheels 14, 15 are driven intermittently and, when they are caused to rotate, their speed is higher than the speed of the wheels 13 and is selected in such a way that the layer of cigarettes C is condensed or remains condensed while moving toward the apices of the wheels 15. The arrangement is such that no cigarette will be permitted to advance beyond the apices of the wheels 15 so that no cigarette is lost and that all cigarettes are transferred into the tray 3.

It goes without saying that the operation of the collecting conveyor 1 may be reversed so that a layer of closely adjacent rod shaped articles may be transformed into a layer wherein the articles are more distant from each other. This can be achieved by feeding rod shaped articles to the left-hand end of the conveyor, as viewed in FIG. 2, and by driving the sprocket wheels 13–15 in a clockwise direction. For example, and if rows of cigarettes are being transferred from a tray 3, such rows may be transformed into a continuous layer of cigarettes wherein the distance between the adjacent cigarettes exceeds the distance between the cigarettes in rows which are being withdrawn from a filled or partially filled tray.

The wheels 13 are rotated continuously by a drive means which will be described in connection with FIG. 7. When the conveyor 1 is about to form a condensed group of cigarettes, the wheels 15 are brought to a halt in a first step so that the wheels 14 continue to deliver cigarettes in a direction to the left, as viewed in FIG. 2, and that the leftmost portion of the upper run of the conveyor 1 collects a series of carriers 11 in close proximity to each other. When the condensed group contains a requisite number of cigarettes, the plunger P transfers a row of cigarettes into the tray 3. At the same time, the wheels 13 continue to advance cigarettes toward the wheels 14 so that the layer of cigarettes is partially condensed ahead of the wheels 14 and is advanced toward the wheels 15 as soon as the wheels 15 begin to rotate in a counterclockwise direction, as viewed in FIG. 2.

It is possible to operate the conveyor 1 in such a way that the sprocket wheels 14, 15 rotate at different speeds so that the upper stringer of the conveyor always contains a group of closely adjacent carriers 11. When the space between the sprocket wheels 14, 15 receives a requisite number of cigarettes, at least the wheels 15 are arrested to remain idle during the transfer of a fresh row into the tray 3. As soon as the transfer of a fresh row is completed, the wheels 15 again begin to rotate at a speed which exceeds the speed of the wheels 13.

FIG. 3 illustrates a somewhat modified apparatus with a different wheel-mounted carriage 240 which serves as a means to deliver empty trays 230' to the transfer station 250 and to collect filled trays 230'' subsequent to advance of a filled tray through and past the transfer station. The trays 230' are suspended on pairwise arranged overhead beams 241 by means of hooks or hangers 242. The side walls of the trays are provided with projections 234 which engage with the mechanism carried by a pair of columns 251, 252, and this mechanism thereupon lower consecutive empty trays 230' along one side of the collecting conveyor 1, i.e., between the sprocket wheels 14, 15 of which only the wheels 14 are shown in FIG. 3. The bottom wall 244 of the carriage 240 is provided with transversely extending grooves 243 each of which may receive a filled tray 230''. The plunger of the transfer mechanism is concealed by a hood 250a and the auxiliary source 221 of FIG. 3 comprises a platform 221a which may accommodate two or more trays 221b one of which delivers non-defective cigarettes into the pockets of the refilling drum 2. The construction of the collecting conveyor 1 is the same as described in connection with FIGS. 1 and 2. The common shaft of the sprocket wheels 13 is shown at 13a.

The tray 230 which is located at the transfer station 250 sends an impulse to a mechanism 240a which advances the carriage 240 as soon as this tray enters the groove 243 therebelow whereby the carriage automatically advances the foremost empty tray 230' onto the space between the columns 251, 252 so that the empty tray takes a position in which its bottom wall may receive a first row of cigarettes. It goes without saying that the carriage 240 may support a larger number of trays and that this carriage may constitute one element of a train of carriages which travel in a direction parallel with the axes of the cigarettes C, see the arrow 240b.

FIG. 4 illustrates a third apparatus which comprises an endless overhead conveyor 360 (shown in phantom lines) for hangers 361 which serve to deliver empty trays 330' toward the transfer station 350. One or more empty trays 330b', 330c' are held in reserve behind the transfer station 350 while a tray 330 descends between the columns 351, 352 to receive a requisite number of condensed cigarette rows. The means for disconnecting empty trays 330' from the respective hangers 361 comprises two so-called pickup columns 342, 343 which form part of a stationary carriage 340. The columns 342, 343 are provided with pivotable lowering mechanisms 344, 345 which engage the foremost empty tray 330' while the respective hanger 361 continues to advance (arrow 340b) so that the foremost empty tray is disengaged from its hanger (see the phantom-line position 330a') and is ready to be lowered onto an intermittently moving upper platform 346 where it takes a position corresponding to the position of the tray 330b'. The carriage 340 comprises an advancing mechanism arranged to move the tray 330b' and the tray 330c' which is located ahead of the tray 330b', by advancing the platform 346 a step in a direction toward the transfer station 350 as soon as the tray 330 has descended close to or into its lower end position. This tray 330 is then advanced with a lower platform 347 to move the foremost filled tray 330a'' between a pair of lifter columns 348, 349 which are equipped with a suitable lifting mechanism (not shown) capable of raising the filled tray into the path of an empty hanger 361 so that the hanger engages the filled tray (see the filled tray 330b'') and advances it toward a wrapping or packing machine, not shown. A second filled tray 330c'' is located on the lower platform 347 directly behind the tray 330a''. The platforms 346, 347 and the columns 342, 343, 348, 349 together form the carriage 340. The platform 346 performs the same function as the overhead beams 241 in the apparatus of FIG. 3.

The construction of the collecting conveyor 1 is the same as described in connection with FIGS. 1 and 2. The auxiliary source of cigarettes C is not shown in FIG. 4. The reference numeral 15a indicates the common shaft of the sprocket wheels 15.

If the overhead conveyor serves to deliver filled trays from an apparatus which is located upstream of the apparatus shown in FIG. 4, such filled trays merely pass between the pivotable mechanisms 344, 345 and do not descend along the columns 342, 343.

While travelling through the transfer station 350 of FIG. 4, the trays advance in a path which is similar to the path 31–33 of FIG. 1.

The trays which are used in the apparatus of FIGS. 1, 3 and 4 are capable of supporting the underside and at least two vertical sides of a stack of rod shaped articles. In the illustrated embodiments, each tray has a rear wall so that the stacks of rod shaped articles which are accommodated in such trays are actually supported at four sides, namely, along the underside, along the rear side, and along two lateral sides. The front side of a tray which descends along the transfer station remains open, at least during transfer of consecutive rows of articles, but each filled tray may be closed manually or in a fully automatic way by providing suitable front covers which are lifted while the trays descend along the transfer station and which may close as soon as a tray is filled.

By moving the trays in a path which is in part parallel and in part perpendicular to the axes of the rod shaped articles (arrows 31–33 in FIG. 1), the length of such paths is reduced to a minimum and the trays may be advanced by a very simple mechanism to reduce the cost and the dimension of the apparatus.

Due to the provision of one or more spare empty trays in a zone behind the transfer station (see the trays 3' in FIG. 1, the trays 230' in FIG. 3 and the trays 330b', 330c' in FIG. 4), the feed of such empty trays to the transfer station is independent of the delivery of empty trays to the respective carriage. In other words, it is an additional feature of the present invention that a supply of empty trays is held ready in a zone which is located immediately behind the transfer station so that the apparatus may draw consecutive empty trays from such supply rather than from the conveyor which delivers empty trays to the apparatus. It will be readily understood that the provision of such supply of empty trays is of considerable advantage if one considers that a modern cigarette rod making machine or filter cigarette machine operates at very high speeds so that the delivery of empty trays into the actual transfer station must take place at frequent intervals if the apparatus is to operate without interruptions and in synchronism with the operation of such machines. It is immaterial whether the supply of empty trays contains one or more trays which rest on a platform or which are suspended in the hangers of an overhead conveyor as long as such trays are ready for immediate delivery to the transfer station with little loss in time. If the empty trays are delivered by an overhead conveyor, they may descend by gravity as soon as they are disconnected from the hangers, especially if the pathway along which they must descend by gravity is rather short. The same applies for filled trays, i.e., each filled tray may descend by gravity and is thereupon advanced in the axial direction of the articles.

As shown in FIGS. 1, 3 and 4, it is not necessary to remove each filled tray as soon as it leaves the transfer station. This is of advantage because the carriage may collect a series of filled trays prior to delivering them to an overhead conveyor or to the next processing station. In other words, and assuming that there is a worker who removes filled trays from the apparatus of my invention, such worker need not be on the constant alert in order to make sure that each filled tray is removed as soon as it leaves the transfer station because the carriage (irrespective of whether the carriage is stationary or movable) will collect a series of filled trays and will still permit entry of empty trays into the actual transfer station.

It will be noted that the supply of empty trays is located at a level above the series of filled trays. This is of advantage because the trays must descend only once, namely, while they move stepwise to receive consecutive rows of rod shaped articles; otherwise, the trays may travel in paths whose direction is parallel with the axes of the rod shaped articles excepting, of course, if the apparatus comprises an overhead conveyor of the type shown in FIG. 4 which is arranged to receive filled trays and to advance them to the next processing station while the filled trays travel at the general level of empty trays which advance toward the apparatus, i.e., toward the columns 342, 343 of FIG. 4. For example, the overhead conveyor 360 of FIG. 4 may deliver filled trays to one or more wrapping machines (not shown) and thereupon receives empty trays from the same machine or machines so that the trays travel in a closed path including the path sections extending between the columns 342, 343, along the upper platform 346, along the transfer station 350, along the lower platform 347, and along the columns 348, 349.

As explained hereinabove, the overhead conveyor 360 is preferably constructed in such a way that filled trays which might advance toward the columns 342, 343 will pass the mechanisms 344, 345 without descending onto the platform 346 and that only an empty tray will be disconnected from the respective hanger 361. Heretofore, it was customary to detach trays by hand and to deliver such empty trays to the transfer station. To my knowledge, this is the first apparatus which cooperates with a fully automatic overhead conveyor.

The provision of a special scanning device which determines the absence of cigarettes at a point ahead of the auxiliary source of cigarettes is advisable in the event that the apparatus is not equipped with an automatic testing device, i.e., when the defective cigarettes are removed by hand.

Figure 5:
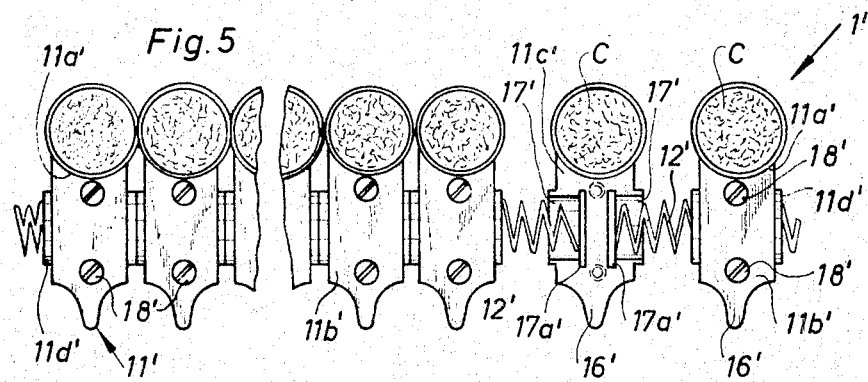
FIG. 5 is an enlarged fragmentary side elevational view of a second collecting conveyor which is similar to the conveyor of FIG. 2 and wherein the carriers for rod shaped articles are coupled to each other by helical expansion springs or by helical compression springs.

FIG. 5 illustrates a portion of a collecting conveyor 1' which is similar to the conveyor 1 of FIG. 2. This conveyor also comprises three pairs of sprocket wheels or three drum-shaped sprockets (not shown) and a series of specially configurated composite holders or carriers 11' each having an elongated concave pocket 11a' which may accommodate a cigarette C. Each of these carriers 11' comprises two sections 11b', 11c' which are connected to each other by pairs of threaded bolts or screws 18'. The abutting end faces of cooperating sections 11b', 11c' are formed with pairs of semicylindrical cutouts 17' each having at its inner end a larger-diameter portion 17a' arranged to receive the end convolution of a coupling spring 12'. By snapping the end convolutions of the springs 12' into pairs of such end portions 17a' and by thereupon connecting the cooperating sections 11b', 11c' by bolts 18', one obtains an endless train of carriers 11' whose teeth 16' may engage the teeth on the sprocket wheels. If the springs 12' are of the type which normally tend to expand, the carriers 11' will be moved apart in a fully automatic way so that the sprocket wheels 14, 15 (see FIG. 2) will be compelled to operate against the bias of such springs. On the other hand, if the springs 12' normally tend to contract, the sprocket wheels 13 of FIG. 2 will be compelled to overcome the bias of these springs when they rotate to increase the distance between the adjacent carriers 11'. It will be noted that the width of the carriers 11' equals or is less than the diameter of a cigarette C so that the adjacent cigarettes are in substantially linear contact with each other when the carriers are moved into abutment with each other in a manner as shown in the left-hand portion of FIG. 5. The springs 12' are then fully concealed and the adjacent carriers are provided with annular stops 11d' which move into actual abutment with each other.

Each pair of sprocket wheels 13, 14, 15 may be replaced by a single sprocket wheel or by a toothed drum or gear whose teeth engage with the teeth 16'.

Figure 6:
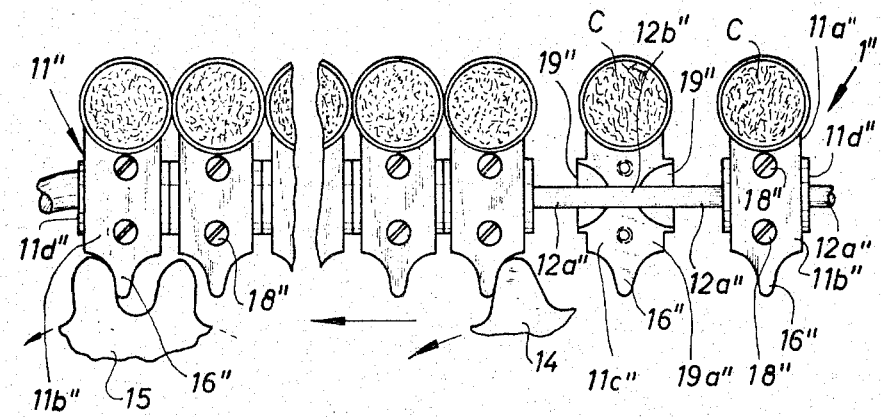
FIG. 6 is a similar enlarged fragmentary side elevational view of a third collecting conveyor wherein the carriers are coupled to each other by one or more endless bands, strips or rods of elastic material.

FIG. 6 shows a portion of a collecting conveyor 1" which comprises a train of carriers 11" each consisting of two sections 11b", 11c". The springs 12' of FIG. 5 are replaced by an endless rod or belt 12a" of flexible elastic material which has spaced portions 12b" clamped between pairs of cooperating sections 11b", 11c". These sections are connected to each other by bolts 18" and are provided with teeth 16" which may mate with the teeth of sprocket wheels 13, 14, 15 (only the wheels 14 and 15 are shown in FIG. 6). The dimensions of substantially semicylindrical central portions 19a" in the cutouts 19" provided in the abutting end faces of the cooperating carrier sections 11b", 11c" are selected in such a way that the sections 11b", 11c" compress the portions 12b" and prevent axial displacement of such portions when the bolts 18" are driven home. Otherwise, the construction of the carriers 11" is analogous to that of the carriers 11'. It will be noted that each cutout 19" has two outwardly diverging (cupped) end portions which accommodate the corresponding sections of the rod 12a" when the latter is permitted to contract whereby its diameter increases. This rod 12a" may consist of rubber or elastic plastic material and it tends to maintain the stops 11d" of adjacent carriers 11" in permanent abutment with each other. The cigarettes C are received in aligned pockets 11a" of cooperating carrier sections 11b", 11c".

It goes without saying that the endless rod 12a" may be replaced by a series of elastic rods of finite length whose end portions are anchored in pairs of adjacent carriers 11". Also, it is possible to use an endless flexible rod or belt of non-elastic material which is fixed to a single carrier 11" and which extends loosely through bores provided in the remaining carriers. The carriers are then shifted with respect to each other in response to engagement with the teeth of the respective sprocket wheels but need not be biased toward or away from each other.

Referring now to FIG. 7, there is shown a modified collecting conveyor 101 which is a functional equivalent of the conveyors 1, 1', 1" and which may be used in each of the apparatus shown in FIGS. 1, 3 and 4. This conveyor comprises a first pair of sprocket wheels 102 mounted on a shaft 103 which is driven by a suitable gear deriving motion from the main drive of the apparatus. Two coaxial intermediate sprocket wheels 105 are disposed between the longitudinal ends of the conveyor 101, and a third pair of sprocket wheels 106 whose shaft 107 need not be driven is provided at the left-hand end turn of the conveyor, as seen in FIG. 7.

Figure 10:
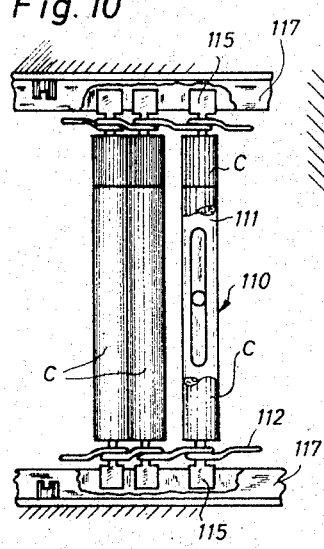
FIG. 10 is an enlarged fragmentary top plan view of the conveyor which is shown in FIG. 7 with certain parts omitted.
Figure 8:
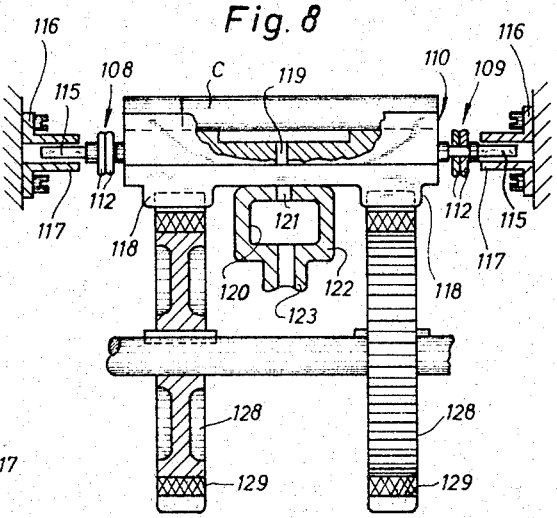
FIG. 8 is an enlarged fragmentary transverse vertical section as seen in the direction of arrows from the line VIII—VIII of FIG. 7.
Figure 9:
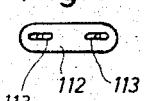
FIG. 9 is a side elevational view of a specially configured link of the type utilized in two link chains which form part of the conveyor shown in FIG. 7.
Figure 11:
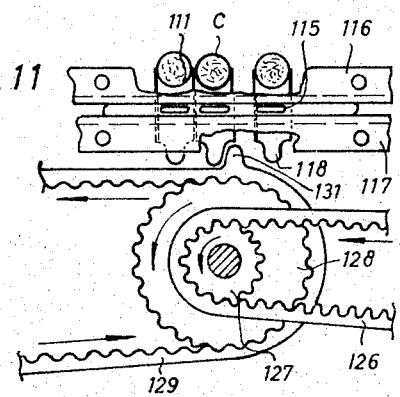
FIG. 11 is a greatly enlarged fragmentary side elevational view of a portion of the conveyor which is shown in FIG. 7.

Two specially constructed endless link chains 108, 109 (see FIG. 8) are trained around but do not engage with sprocket wheels 102, 105, 106, and the links 112 of these chains carry transversely extending carriers 110 each provided with a pocket 111 adapted to receive a cigarette C. The links 112 are provided with pairs of elongated slots 113 (see FIG. 9) which receive pins 114 extending from the end faces of the respective carriers 110 so that the carriers are movable with respect to the links and with respect to each other in the longitudinal direction of the chains 108, 109. Each pin 114 extends through the slots 113 of two overlapping links 112 and each of these pins carries at its outer end a flat runner 115 (see FIGS. 10 and 11) received in the gap between a pair of horizontal guide rails 116, 117 which extend along the upper stringer of the conveyor 101. Each link 112 comprises a pair of flat end portions which are formed with the slots 113 and a median portion which connects the slotted end portions so that such end portions are located in two parallel planes, see FIG. 10.

Each carrier 110 is provided with two spaced projections or teeth 118. Intermediate its teeth 118, each carrier 110 is formed with a suction duct 119 (see FIG. 8) which communicates with the respective pocket 111 and with the intake slot 121 of a stationary suction chamber 120 defined by an elongated channel shaped tubular member 122 which forms part of a suction generating device and is disposed beneath the upper stringer of the conveyor 101. This member 122 may but need not extend all the way from the sprocket wheels 102 to the sprocket wheels 106. The purpose of the member 122 is to retain the cigarettes C in the respective pockets 111 by maintaining the pressure in the ducts 119 below atmospheric pressure so that atmospheric air actually presses the cigarettes against the surfaces which surround the respective pockets. The tubular member 122 is provided with one or more nipples 123 connected to the suction side of a fan, not shown.

The shaft 124 of the sprocket wheels 105 carries a sprocket 125 which drives a chain 126 trained around a sprocket 127 mounted on the common shaft of two axially spaced sprockets 128 (see also FIG. 8) each of which drives a chain 129. The chains 129 are trained around sprockets 130 and each thereof carries two spaced motion transmitting projections or teeth 131 arranged to engage selected teeth 118, see FIG. 11.

Figure 12:
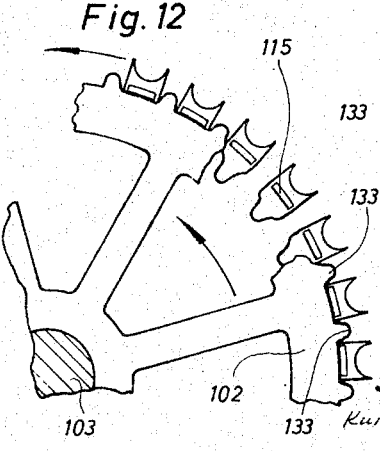
FIG. 12 is a greatly enlarged fragmentary side elevational view of one of the right-hand sprocket wheels which are shown in FIG. 7.

The teeth 133 of the sprocket wheels 102 and the teeth 134 of the sprocket wheels 105 are arranged to enter the gaps between the adjacent runners 115 to thereby advance the carriers 110 in an endless path a horizontal portion of which extends along the upper stringer of the conveyor 101 and along the transfer station. The manner in which the teeth 133 of a sprocket wheel 102 enter the gaps between the runners 115 of adjacent carriers 110 at the right-hand end turn of the conveyor 101 is shown in FIG. 12.

Referring again to FIG. 7, a blocking or arresting member here shown as a bell crank lever 136 is arranged to pivot about a fixed horizontal pin 137 and is biased by a helical spring 143 so that it normally engages one of two lugs 138a, 138b provided on one of the sprocket wheels 106. A push rod 139 connects the downwardly extending arm of the blocking lever 136 with a second lever 140 which is pivotable about a fixed pin 141 and whose upper end portion extends into the path of a trip 142 provided on one of the intermediate sprocket wheels 105.

The right-hand ends of the guide rails 116, 117 are bent away from each other to provide room for unimpeded entry of runners 115 which are being advanced by the sprocket teeth 133. The left-hand ends of the rails 116, 117 terminate in or close to a vertical plane passing through the axis of the shaft 107.

FIG. 7 also shows a transfer member or plunger 145 which corresponds to the plunger P of FIG. 1 and which serves to move consecutively assembled horizontal rows of cigarettes C lengthwise into a tray such as the tray 3 of FIG. 1.

The manner in which the plunger 145 is mounted for movement transversely of the upper stringer of the conveyor 101 is illustrated in FIGS. 13 to 19. Two pairs of articulately mounted arms 146, 147 support the plunger 145 in such a way that the latter is rockable with respect to a horizontal supporting plate 148. The upper ends of two pairs of helical springs 149, 150 are affixed to the pivots 151, 152 which connect the arms 146, 147 with the plunger 145, and the lower ends of these springs are secured to pins 153, 154 carried by the plate 148. The pins 143, 154 are located at a level below and are in vertical alignment with pivots 155, 156 which connect the arms 146, 147 with the supporting plate 148.

The plate 148 is provided with studs 157 constituting stops which may abut against the arms 146, 147, and the plunger 145 carries two brackets 158 which may abut against the stops 160 of a retaining strip 159. This strip 159 extends transversely across and is located above the trailing ends of cigarettes C which are deposited in the tray 3 at the transfer station 5.

Figure 20:
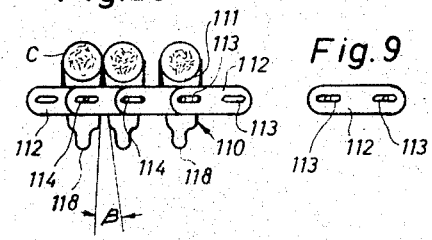
FIG. 20 illustrates a portion of one of two link chains which form part of the collecting conveyor shown in FIG. 7 and which cooperate with specially configurated carriers for rod shaped articles.
Figure 21:
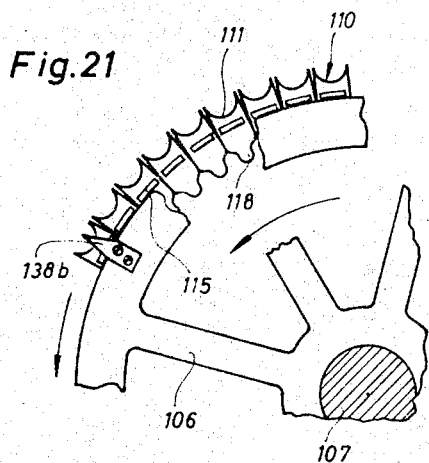
FIG. 21 illustrates a portion of one of two sprocket wheels which are located at the left-hand end of the conveyor shown in FIG. 7.

Prior to describing the operation of the conveyor 101, reference will be had to FIGS. 20 and 21 which show that the side faces of the carriers 110 are inclined with reference to each other in order to make an acute angle beta so that such side faces of adjacent carriers may abut against each other when the carriers travel around the sprocket wheels 106. It will be noted that the pockets 111 are empty when the carriers 110 travel around the sprocket wheels 106 and toward the lower stringer of the conveyor 101.

The apparatus of FIGS. 7 to 21 operates as follows:

After the plunger 145 has transferred a row of cigarettes C into the tray 3 of FIGS. 13 to 19 by shifting a predetermined number of cigarettes axially from the zone AA of the upper stringer, the brackets 158 come in abutment with respective stops 160 (see FIG. 15) to hold the plunger 145 against further advance in a direction to the left, as viewed in FIG. 15. The supporting plate 148 (which is reciprocated by a double-acting pneumatic cylinder or the like) continues to move in a direction to the left, as viewed in FIG. 15, to reach the position shown in FIG. 16 whereby the springs 149, 150 are caused to expand until the pins 153, 154 move into vertical alignment with the pivots 151, 152 so that the arms 146, 147 are compelled to snap over from the positions of FIG. 15 to the positions of FIG. 17. Of course, as the arms 146, 147 are caused to rock about the pivots 155, 156 the plunger 145 is lifted to the position of FIG. 17 whereby its front end face moves upwardly and away from the uppermost row of cigarettes C in the tray 3 and the retaining strip 159 prevents the cigarettes from following such return movement of the plunger.

The extent to which the arms 146, 147 may be rocked in a clockwise direction, as viewed in FIGS. 15 to 17, is limited by the stops 157 which abut against the respective arms when the arms reach the positions of FIG. 17. Once the arms assume such positions, they are held by springs 149, 150 which are free to contract as soon as the pins 153, 154 are aligned with the pivots 151, 152 (FIG. 16). It can be said that the arms 146, 147 are bistable by tending to remain in the positions of FIG. 14 or 17.

The positioning of the stops 147 is such that they maintain the plunger 145 at a level above the cigarettes C on the upper stringer of the conveyor 101 (see FIG. 17) so that the plunger may return to its starting position (FIG. 13) without interfering with the movement of cigarettes toward the sprocket wheels 106.

At the time the plunger 145 has been lifted to the position of FIG. 17, the trip 142 of the respective sprocket wheel 105 engages the lever 140 and moves the blocking lever 136 via push rod 139 (see the arrow 139a) away from the lug 138a so that the sprocket wheels 106 are free to rotate. At the same time, the upper teeth 131 of the chains 129 engage the nearest set of teeth 118 and advance a requisite number of loaded carriers 110 toward the sprocket wheels 106 to accumulate a requisite number of cigarettes C along the open front side of the tray 3. This tray has descended a notch subsequent to transfer of the preceding row of cigarettes so that it is now in a position to receive the next row. The upper teeth 131 of the chains 129 will advance that group of carriers 110 which is located in the zone BB (see FIG. 7) along the upper stringer of the conveyor 101. Such carriers are then transferred into the zone AA. For example, if the zone AA of FIG. 7 accommodates fifty empty carriers 110, there are fifty loaded carriers 110 in the zone BB ready for transfer into the zone AA as soon as the sprocket wheels 106 are unblocked by the lever 136. Of course, the carriers 110 in the zone BB are immediately adjacent to each other because the sprocket wheels 102 are driven continuously and deliver loaded carriers into a zone CC irrespective of whether the lever 136 is in blocking position or whether the sprocket wheels 106 are free to rotate.

When the teeth 131 advance a new supply of loaded carriers 110 from the zone BB into the zone AA, an equal number of empty carriers if caused to leave the zone AA and to advance around the left-hand sides of the sprocket wheels 106 toward the lower stringer of the conveyor 101 where the empty carriers move apart because the sprocket wheels 102 continue to rotate in a sense to move such empty carriers toward the right-hand end turn of the conveyor.

The angular distance between the lugs 138a, 138b on one of the sprocket wheels 106 equals 180 degrees so that fifty closely adjacent carriers 110 (see FIG. 17) will occupy one-half of the periphery of a wheel 106. Once, the wheels 106 have completed one-half of a full revolution, the lug 138b engages the blocking lever 136 and arrests the wheels 106. At the same time, the upper teeth 131 on the chains 129 have begun to move away from the upper stringer of the conveyor 101 by travelling along the peripheries of the sprockets 130 so that the loaded carriers 110 in the zone BB are at a standstill and that the zone CC begins to accumulate a group of closely adjacent carriers which are thereupon transferred into the zone BB as soon as the orbiting trip 142 reengages the lever 140. It will be noted that the spring 143 immediately returns the blocking lever 136 to the position of FIG. 7 as soon as the trip 142 passes the upper end portion of the lever 140 so that the lever 136 normally extends in the path of the lug 138a or 138b.

The zone DD which extends along the upper stringer of the conveyor 101 from the apices of the sprocket wheels 102 to the zone CC contains a series of constantly moving carriers 110, and the refilling wheel 2 (see FIG. 1) is preferably adjacent to this zone to introduce a cigarette C into each empty carrier before the carriers enter the zone CC.

The sprocket wheels 102 and 104 rotate at a constant speed $v_1$, and the empty carriers 110 which are adjacent to the lower stringer of the conveyor 101 travel at the same constant speed. The chains 129 are driven at a second constant speed $v_2$ which is related to the speed $v_1$ as follows: A carrier 110 advancing from the apices of the wheels 102 to the apices of the wheels 104 requires for such travel an interval of time $t$ if the chains 108, 109 are fully expanded along the entire zone DD. The same interval $t$ is necessary to advance a row of loaded and closely adjacent carriers 110 from the zone BB into the zone AA and to thereupon transfer a row of cigarettes C into the tray 3. The arrangement may be such that a pair of transversely aligned teeth 131 will require an interval $t/2$ for advancing fifty loaded carriers 110 from the zone BB into the zone AA and that the plunger 145 will require an interval $t/2$ to transfer fifty cigarettes C into the tray 3. Consequently, the speed of the chains 129 is twice the speed of the chains 108, 109 along the lower stringer of the conveyor 101 and along the zone DD. In other words, $v_1=v_2/2$.

At the time the plunger 145 transfers a fresh row of cigarettes C into the tray 3, i.e., at the time the plunger 145 evacuates a row of cigarettes from the zone AA by moving the cigarettes lengthwise while the sprocket wheels 106 are blocked by the lever 136, the zones BB and CC accumulate a number of closely adjacent carriers 110 each of which supports a cigarette C. In the next step, the upper pair of teeth 131 on the chains 129 advances a series of closely adjacent carriers 110 from the zone BB into the zone AA by simultaneously expanding the chains 108, 109 along the zone CC because the teeth 131 travel at a speed $v_2$ which is twice the speed $v_1$ of the sprocket wheels 102, 105. In other words, the carriers 110 which are located in the zone CC will move away from each other to stretch the corresponding portions of the chains 108, 109 whenever a pair of teeth 131 transfers a new supply of carriers from the zone BB into the zone AA. However, when the teeth 131 move away from engagement with the teeth 118 on the last carrier in the zone BB, one of the lugs 138a, 138b moves into abutment with the blocking lever 136 and arrests the sprocket wheels 106 so that the carriers contained in the zones AA and BB are arrested and the zone CC may accumulate a fresh supply of closely adjacent carriers because the wheels 102, 105 rotate without interruption and the wheels 105 continue to deliver loaded carriers into the zone CC in which the carriers are moved into actual abutment with each other and form a row of closely adjacent carriers wherein the number of carriers equals the number of carriers in the zone AA or BB plus the number necessary to permit expansion of chains 108, 109 in response to engagement between a pair of teeth 131 and the teeth 118 on the rearmost carrier in the zone BB. In other words, and if the sprocket wheels 102, 105 are driven at a peripheral speed $u_1$, the sprocket wheels 106 are driven intermittently at a peripheral speed $u_2=2u_1$.

The suction chamber 120 may but need not extend along the entire upper stringer of the conveyor 101. It is important that this chamber should extend along the zones AA and BB in which the cigarettes C are accelerated very rapidly from zero speed to the speed $v_2$ which may be high enough to cause ejection of cigarettes from the respective pockets 111 in the absence of any means which would hold the cigarettes in the respective carriers. The speed $v_1$ being less than the speed $v_2$, the provision of a suction chamber beneath the zone DD is not essential but is advisable, especially if the conveyor 101 receives cigarettes directly from a modern cigarette rod making machine which is capable of delivering up to 2,000 cigarettes per minute.

Referring again to FIGS. 13 to 19, when the supporting plate 148 approaches the rear end of its stroke (i.e., when this plate moves away from the open front side of the tray 3), the rear end face of the lifted plunger 145 (in the position of FIG. 17) comes in abutment with a fixed stop face 165, see FIG. 18, which causes the arms 146, 147 to pivot in a counterclockwise direction and to expand to springs 149, 150 so that the springs snap back to the positions of FIG. 14 or 19 and cause the plunger 145 to descend toward the upper side of the supporting plate 148 whereby its front end face registers with the new row of cigarettes C in the zone AA. Thus, the plunger is now ready to perform the next forward stroke and to transfer the freshly assembled row of cigarettes into the trap 3 which latter has descended a notch to provide room for the fresh row of cigarettes.

The movements of the supporting plate 148 are synchronized with the rotational speed of the sprocket wheels 102, 105 to make sure that the plunger 145 will immediately engage a fresh row of cigarettes C as soon as a pair of teeth 131 has entrained a series of loaded carriers 110 from the zone BB into the zone AA.

FIG. 7a illustrates the collecting conveyor 101 in an intermediate position when the lugs 138a and 138b moved beyond the blocking lever 136 and when the trip 142 is spaced from the upper end of the lever 140. The upper teeth 131 are located midway between the sprockets 128, 130 and continue to advance a fresh group of loaded carriers into the zone AA, the combined length b of such condensed group of carriers being equal to the length of the zone AA or BB. The total number of carriers in the zone CC is then reduced to about the number necessary to permit full expansion of the chains 108, 109 along the zone CC.

FIG. 7b again illustrates the collecting conveyor 101 and shows that the tubular member 122 need not extend beyond the zone BB, i.e., to the left and beyond the apices of the sprockets 128. The lug 138a is shown in a position in which it is engaged by the blocking lever 136, not shown in FIG. 7b.

In the collecting conveyor 101 of FIGS. 7 to 21, there is no means for compelling the carriers 110 to move into abutment with each other, i.e., the conveyor 101 is without an equivalent of the resilient elements 12 shown in FIG. 2 and its carriers will move nearer to each other solely in response to the difference in rotational speeds of the sprocket wheels 102 and 106.

Figure 22:
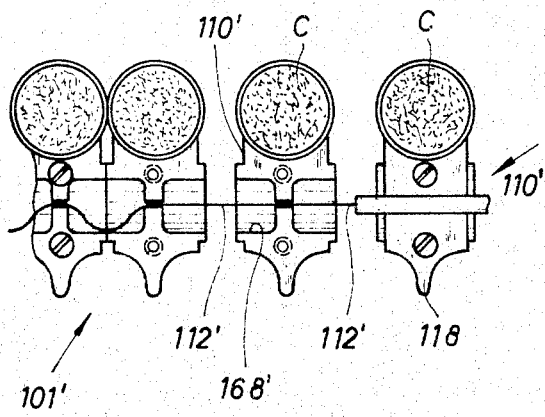
FIG. 22 is an enlarged fragmentary side elevational view of a fifth collecting conveyor whose article-receiving carriers are coupled to each other by one or more flexible elements of non-elastic material.
Figure 23:
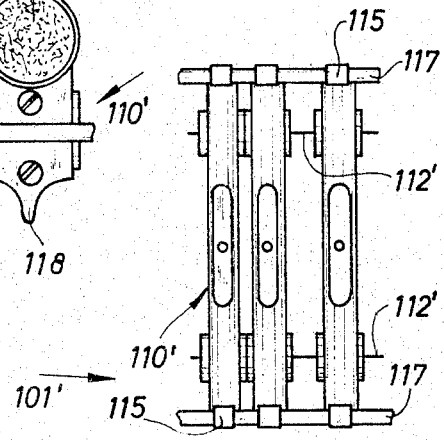
FIG. 23 is a smaller-scale top plan view of a portion of the conveyor which is shown in FIG. 22.

FIGS. 22 and 23 illustrate a portion of a collecting conveyor 101' which comprises carriers 110' connected to each other by flexible bands or cords 112'. Each cord 112' is anchored in each of the carriers 110' so that the carriers may move toward and away from each other to the extent determined by the length of cord portions between two adjacent points of attachment. As shown in FIG. 22, each carrier 110' is formed with recesses 168' which accommodate portions of the cords 112' when the carriers are in actual abutment with each other. The cords 112' need not be elastic, i.e., the conveyor 101' is analogous to the conveyor 101 of FIG. 7.

In summation, the collecting conveyor of this invention is provided with carriers which are movable relative to each other in directions in which the conveyor advances and which may but need not be biased in a sense to move into abutment with each other, i.e., to reduce the width of the gaps between the adjacent carriers to a minimum. Also, the carriers may but need not be directly coupled to each other as long as the conveyor comprises some means which prevents undue separation of the carriers and which insures that the stringers of the conveyor are properly engaged by the teeth of the sprocket wheels and sprockets which are used to drive selected sections of the conveyor at requisite speeds.

An important advantage of a mechanical row forming device which utilizes the collecting conveyor of this invention is that the conveyor may be rapidly adjusted to operate at different speeds, that all of its parts are readily accessible for inspection, interchange or repair, that the conveyor may simultaneously serve as a means for advancing the cigarettes from a cigarette rod making machine or filter cigarette machine directly to the transfer station, and that the operation of the conveyor may be reversed so that the conveyor will increase the distance between adjacent rod shaped articles.

In FIG. 24, the testing device T comprises a sensing or scanning device including a short endless belt 170 trained around rollers 170a, 170b and located at one side of the conveyor 1. A wheel 171 provided with radially extending scanning elements 171a is adjacent to the other side of the conveyor 1 opposite the belt 170 and its elements 171a are arranged to send an impulse through a suitable connection 172 (e.g., a link train) whenever they detect the presence of a defective cigarette. The connection 172 then admits a blast of compressed air through an ejector nozzle 173 which ejects the defective cigarette Cd from the respective carrier 11. The ejector nozzle 173 is connected to an air compressor or a similar source of a valve 175 which is actuated by the mechanical connection 172. The line 174 is connected to a suitable electromagnetic valve 176 which is normally closed. An electromagnetic clutch 177 which is normally idle is adapted to couple a driver gear 178 with the shaft 179 of the refilling drum 2 which then deposits a non-defective cigarette C into the pocket of an empty carrier 11e. The gear 178 forms part of a gear train including a second gear 178a rotated by the main drive of the machine which delivers cigarettes C to the collecting conveyor 1.

The drum 2 receives cigarettes from a transfer drum 180 which in turn receives cigarettes from the magazine 21 through a suitable chute 21a. Shields 181 are provided to retain cigarettes in the pockets of the drums 2 and 180.

The apparatus of FIG. 24 further includes a second scanning device including a light source 182 and a registering photoelectric cell 182a which sends impulses to an amplifier 182b and to a control device 182c which is operatively connected with the clutch 177 and with a normally open electromagnetic valve 183. The valve 183 is mounted in a suction conduit 184 which is connected to a suction fan or to another suction generating device and which may shut off the suction in that pocket 185 of the refilling drum 2 which is located directly above an empty carrier 11e. The control device 182c is further connected to the valve 176.

The testing and ejector devices of FIG. 24 operate as follows:

When the wheel 171 detects the presence of a defective cigarette Cd, it sends an impulse through the mechanical connection 172 so that the latter admits a blast of compressed air into the ejector nozzle 173 at the time the defective cigarette Cd is aligned with the discharge orifice of this nozzle. The defective cigarette Cd is ejected in a fully automatic way to drop into a suitable receptacle, not shown, and the empty carrier 11e advances toward the light source 182. The cell 182a detects the absence of a cigarette in the carrier 11e and sends an impulse to the control device 182c which initiates a series of operations including closing the valve 183 which controls the suction in that pocket 185 which is to deliver a non-defective cigarette into the pocket 11e, energizing the clutch 177 so that the latter rotates the drum 2 in the same direction and at the same speed at which the empty carrier 11e advances along the upper stringer of the conveyor 1, and opening the valve 176 which delivers a blast of compressed air into the lowermost pocket 185 to eject the respective cigarette into the carrier 11e. The drum 180 is coupled to the refilling drum 2 so that it delivers a cigarette into the adjacent pocket of the refilling drum 2 whenever the latter rotates in response to an impulse received from the control device 182c.

It will be noted that each of the suction ducts 187 in the refilling drum 2 may be connected with the conduit 174 in order to eject a cigarette from the lowermost pocket 185 or with the suction conduit 184 in order to normally retain a cigarette in the respective pocket 185.

The testing device T cooperates with the scanning device 182–182c to insure that each carrier 11 which advances beyond the refilling drum 2 must accommodate a satisfactory cigarette so that the transfer member P at the station 5 of FIG. 1 will always transfer the same number of cigarettes whenever it performs a stroke in a direction to shift a row of cigarettes lengthwise into the tray 3.

The scanning wheel 171 may send impulses directly to the control device 182c so that the cell 182a may be dispensed with. The control device 182c includes a suitable time-lag relay or the like which insures that a non-defective cigarette is always deposited into an empty carrier 11e at the exact time when the empty carrier passes beneath the refilling drum 2.

If the conveyor 1 of FIG. 24 travels at low speed, the control device 182c may be operated manually by means of a pushbutton or the like.

The auxiliary source 2, 21 is of considerable advantage in the event that the delivery of rod shaped articles to the collecting conveyor 1 is interrupted for reasons beyond the control of an operator. This auxiliary source then delivers rod shaped articles until the delivery of articles from a cigarette rod making machine or from a filter cigarette machine is resumed. For example, the magazine 21 (or a series of such magazines—see FIG. 3) may contain a supply which is sufficient to fill one or more trays 3.

The heretofore described endless collecting conveyors may be replaced by other types of collecting conveyors without in any way departing from the spirit of this invention. For example, two pairs of parallel worms may be used the faces of which are grooved so that their treads serve as carriers for rod shaped articles. One pair of worms has a pitch which corresponds to the pitch of the feed conveyor, i.e., to the pitch of the conveyor which delivers rod shaped articles from a cigarette rod making machine or a filter cigarette machine, and the other pair of worms has a pitch which corresponds to the distance between the closely adjacent articles just before the articles are transferred into a tray. Thus, one pair of worms performs the function of the conveyor portion extending along the zones CC and DD of FIG. 7, and the other pair of worms performs the function of that portion of the conveyor 101 which extends along the zones AA and BB of FIG. 7. If no stoppage is necessary, a single pair of parallel worms can be used and the worms of such single pair are of progressive pitch formation so that the rod shaped articles are progressively moved closer to each other and, in the terminal region of both worms, lie closely adjacent to each other. The distance between the worms of each pair is less than the length of a rod shaped article. Of course, such worms can be driven in the opposite direction so as to increase the distance between a layer of closely adjacent rod shaped articles.

The same function can be performed by a member having radially extending grooves converging in the direction toward the tray if the parts in which the grooves are formed are pivotable after the rod shaped articles have been delivered into the grooves in the region in which the articles are spaced from each other. The grooves are then moved nearer to each other to accumulate a row of closely packed articles which are ready for transfer into the tray. In such collecting conveyors, the rod shaped articles may be blown into the tray if the provision of a plunger-like transfer member is not desired.

It is to be understood that the apparatus of the present invention is useful in manipulating all types of rod shaped articles which, either by themselves or with similar rod shaped articles, constitute or form part of tobacco containing products. Such products include rods of chewing tobacco, cigarette rod sections of unit length or multiple unit length, filter cigarettes of unit length or multiple unit length, cigars or cigarillos of unit length or multiple unit length, filter mouthpieces of unit length or multiple unit length, and others.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for manipulating cigarettes and similar rod shaped articles, in combination, an endless collecting conveyor comprising an elongated stringer having a first portion and a second portion located past said first portion as seen in the direction of movement of said conveyor, said conveyor further comprising a plurality of transversely extending carriers each adapted to support a rod shaped article and each reciprocable in the direction of movement of said stringer so as to move toward and away from the other carriers; means for maintaining the carriers at a first and at a uniform second distance from each other while the carriers are respectively located in the first and second portions of said stringer; and means for delivering articles to the carriers in the first portion of said stringer so that such articles form a row of equidistant articles when the corresponding carriers advance to the second portion of said stringer.

2. In an apparatus for manipulating cigarettes and similar rod shaped articles, in combination, an endless collecting conveyor comprising an elongated stringer having a first portion and a second portion located past said first portion as seen in the direction of movement of said conveyor, said conveyor further comprising a plurality of transversely extending carriers each adapted to support a rod shaped article and each reciprocable in the direction of movement of said stringer so as to move toward and away from the other carriers; means for maintaining the carriers at a first and at a uniform second distance from each other while the carriers are respectively located in the first and second portions of said stringer; means for delivering articles to the carriers in the first portion of said stringer so that such articles form a row of equidistant articles when the corresponding carriers advance to the second portion of said stringer; and means for intermittently transferring rows containing predetermined numbers of articles from the carriers in the second portion of said stringer.

3. In an apparatus for manipulating cigarettes and similar rod shaped articles, in combination, an endless collecting conveyor comprising an elongated stringer having a first portion and a second portion located past said first portion as seen in the direction of movement of said conveyor, said conveyor further comprising a plurality of transversely extending carriers each adapted to support a rod shaped article and each reciprocable in the direction of movement of said stringer so as to move toward and away from the other carriers; means for maintaining the carriers at a first and at a uniform second distance from each other while the carriers are respectively located in the first and second portions of said stringer, the distance between the carriers in the first portion exceeding the distance between the carriers in the second portion of said stringer; and means for delivering articles to the carriers in the first portion of said stringer so that such articles form a row of equidistant articles when the corresponding carriers advance to the second portion of said stringer.

4. In an apparatus for manipulating cigarettes and similar rod shaped articles, in combination, an endless collecting conveyor comprising an elongated stringer having a first portion and a second portion located past said first portion as seen in the direction of movement of said conveyor, said conveyor further comprising a plurality of transversely extending carriers each adapted to support a rod shaped article and each reciprocable in the direction of movement of said stringer so as to move toward and away from the other carriers; means for maintaining the carriers at a first and at a uniform second distance from each other while the carriers are respectively located in the first and second portions of said stringer; the distance between the carriers in the first portion exceeding the distance between carriers in the second portion of said stringer; means for continuously advancing said carriers from said first portion toward said second portion and for intermittently advancing the carriers along said second portion; means for delivering articles to carriers moving in the first portion of said stringer so that such articles form a row of equidistant articles when the corresponding carriers advance to the second portion of said stringer; and means for transferring rows containing predetermined numbers of articles from the carriers in the second portion of said stringer during intervals between intermittent advances of said carriers along said second portion.

5. A structure as set forth in claim 4, wherein said stringer is horizontal and wherein the means for transferring rows of articles from carriers in the second portion of said stringer comprises a plunger adjacent to one side of said stringer and means for moving said plunger transversely of said stringer so that the plunger pushes a row of articles lengthwise and off the respective carriers.

6. A structure as set forth in claim 4, further comprising storing means including a tray adjacent to one side of said second portion to receive consecutive rows of articles from said stringer.

7. A structure as set forth in claim 6, wherein said storing means comprises a second conveyor arranged to move a series of trays consecutively to and past the station where the trays receive rows of articles from the second portion of said stringer.

8. A structure as set forth in claim 7, wherein said second conveyor comprises a carriage and an overhead conveyor.

9. In an apparatus for manipulating cigarettes and similar rod shaped articles, a machine for discharging a series of consecutive rod shaped articles a collecting conveyor comprising a first portion, a second portion located past said first portion, and a plurality of carriers in each of said portions and each adapted to support a rod shaped article, said first portion being adjacent to said machine so that the carriers in said first portion receive articles seriatim and advance such articles sideways to the second portion of said conveyor; means for maintaining said carriers at a first and at a uniform second distance from each other while the carriers are respectively located in the first and second portions of said conveyor so that the articles form rows of equidistant articles when the corresponding carriers are located in the second portion of said conveyor; a testing device arranged to detect the presence of defective articles at a point ahead of said second portion; an ejecting device operatively connected with said testing device to eject defective articles from the respective carriers in response to detection of such defective articles by said testing device, said ejecting device being located ahead of said second portion; refilling means located past said ejecting device and ahead of said second portion for replacing each defective article with a satisfactory article so that each carrier entering the second portion of said conveyor supports a satisfactory article; and transfer means for removing rows containing predetermined numbers of articles lengthwise from the carriers in the second portion of said conveyor.

10. In an apparatus for manipulating cigarettes and similar rod shaped articles, in combination, an endless collecting conveyor comprising an elongated stringer having a first portion and a second portion located past said first portion as seen in the direction of movement of said stringer, said conveyor comprising a plurality of transversely extending carriers movable toward and away from each other and arranged to move along the first portion toward and along the second portion and back to the first portion of said stringer; means for maintaining the carriers at a greater and at a shorter distance from each other while the carriers respectively move along the first and second portions of said stringer, said carriers being equidistant from each other at least while moving along the second portion of said stringer; means for advancing said carriers in the endless path defined by said conveyor; means for intermittently arresting a carrier along the second portion of said stringer so that the next following carriers accumulate behind the thus arrested carrier; means for feeding rod shaped articles to carriers along one portion of said stringer; and transfer means for removing rod shaped articles from the carriers along the other portion of said stringer.

11. A structure as set forth in claim 10, wherein said conveyor comprises first and second sprocket means located at the ends of said stringer, third sprocket means located intermediate said first and second sprocket means and between said portions of the stringer, the means for advancing said carriers comprising endless chain means trained around said sprocket means and connected with said carriers so that each carrier is movable within limits with reference to and in the longitudinal direction of said chain means.

12. A structure as set forth in claim 11, further comprising elastic elements connecting the adjoining carriers to each other.

13. A structure as set forth in claim 11, further comprising an endless flexible element connecting said carriers to each other.

14. In an apparatus for manipulating cigarettes and similar rod shaped articles, in combination, an endless collecting conveyor comprising an elongated stringer having a first portion and a second portion located past said first portion as seen in the direction of movement of said stringer, said conveyor comprising a plurality of transversely extending carriers movable toward and away from each other and arranged to move along the first portion toward and along the second portion and back to the first portion of said stringer; means for maintaining the carriers at a greater and at a shorter distance from each other while the carriers respectively move along the first and second portions of said stringer, said carriers being equidistant from each other at least while moving along the second portion of said stringer; means for advancing said carriers in the endless path defined by said conveyor; means for intermittently arresting a carrier along the second portion of said stringer so that the next following carriers accumulate behind the thus arrested carrier; means for feeding rod shaped articles to carriers along one portion of said stringer; suction generating means cooperating with the carriers along the second portion of said stringer to hold the articles in the corresponding carriers; and transfer means for removing rod shaped articles from the carriers along the other portion of said stringer.

15. In an apparatus for manipulating cigarettes, and similar rod shaped articles, in combination, a collecting conveyor having a first portion, a second portion arranged to receive rod shaped articles from said first portion, and a plurality of carriers in each of said portions, each carrier being adapted to support a rod shaped article and the distance between the carriers in said first portion being different from the distance between the carriers in said second portion so that the spacing between the articles changes on movement of such articles from said first portion to said second portion, the carriers in said second portion being arranged to maintain the articles in parallelism and at a uniform distance from each other so that such articles form a row; means for feeding rod shaped articles to the carriers in said first portion; and means for removing rows containing a predetermined number of articles from the carriers in said second portion.

16. In an apparatus for manipulating cigarettes and similar rod shaped articles, in combination, an endless collecting conveyor having a first portion, a second portion arranged to receive rod shaped articles from said first portion, and a plurality of carriers in each of said portions, each carrier being adapted to support a rod shaped article and the distance between the carriers in said first portion being different from the distance between the carriers in said second portion so that the spacing between the articles changes on movement of such articles from said first portion to said second portion, the carriers in said second portion being arranged to maintain the articles in parallelism and at a uniform distance from each other so that such articles form a row; means for feeding rod shaped articles to consecutive carriers in said first portion; means for moving said carriers in an endless path from said first portion through said second portion and back to said first portion; means for removing rows containing a predetermined number of articles from the carriers in said second portion; and means for intermittently arresting the carriers in said second portion during removal of articles.

17. In an apparatus for manipulating cigarettes and similar rod shaped articles, in combination, an endless collecting conveyor having a first portion, a second portion arranged to receive rod shaped articles from said first portion, and a plurality of carriers in each of said portions, each carrier being adapted to support a rod shaped article and the distance between the carriers in said first portion exceeding the distance between the carriers in said second portion so that the spacing between the articles decreases on movement of such articles from said first portion to said second portion, the carriers in said second portion being arranged to maintain the articles in parallelism and at a uniform distance from each other so that such articles form a row; means for feeding rod shaped articles to consecutive carriers in said first portion; means for moving said carriers in an endless path from said first portion through said second portion and back to said first portion; and means for removing rows containing a predetermined number of articles from the carriers in said second portion.

References Cited

UNITED STATES PATENTS

| | | | |
|---|---|---|---|
| 1,565,849 | 12/1925 | Durand | 198—34 |
| 3,089,297 | 5/1963 | Craig et al. | 53—26 |
| 3,108,681 | 10/1963 | Sanchez | 198—34 |
| 3,136,404 | 6/1964 | Hebard et al. | 198—34 |

WILLIAM W. DYER, JR., *Primary Examiner.*

FRANK E. BAILEY, *Examiner.*

P. H. POHL, *Assistant Examiner.*